United States Patent
Rinholm et al.

(10) Patent No.: US 6,984,908 B2
(45) Date of Patent: Jan. 10, 2006

(54) PERMANENT MAGNET MOTOR

(75) Inventors: Brent Gordon Rinholm, Fuquay-Varina, NC (US); Randall John Griffin, Erwin, NC (US); Joseph H. Stevenson, Rohnert Park, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/651,015

(22) Filed: Aug. 26, 2003

(65) Prior Publication Data

US 2005/0046294 A1    Mar. 3, 2005

(51) Int. Cl.
H02K 21/12    (2006.01)

(52) U.S. Cl. .............................. 310/156.8; 310/156.12; 29/598

(58) Field of Classification Search ............. 310/156.8, 310/156.9, 156.11–13, 156.21, 156.22; 29/598
See application file for complete search history.

(56) References Cited

U.S. PATENT DOCUMENTS

| | | | | |
|---|---|---|---|---|
| 3,581,394 A | * | 6/1971 | Phelon .................. | 310/156.31 |
| 4,242,610 A | * | 12/1980 | McCarty et al. ....... | 310/156.59 |
| 4,296,544 A | | 10/1981 | Burgmeier et al. | |
| 4,332,079 A | | 6/1982 | Silver | |
| 4,339,874 A | | 7/1982 | Mc'Carty et al. | |
| 4,445,062 A | * | 4/1984 | Glaser .................. | 310/156.59 |
| 4,464,596 A | | 8/1984 | Miller et al. | |
| 5,063,318 A | | 11/1991 | Anderson | |
| 5,121,020 A | * | 6/1992 | Bertram et al. ........ | 310/156.22 |
| 5,397,951 A | * | 3/1995 | Uchida et al. ......... | 310/156.21 |
| 5,528,697 A | * | 6/1996 | Saito ........................... | 381/396 |
| 5,631,512 A | * | 5/1997 | Kawabata et al. ..... | 310/156.15 |
| 5,758,709 A | | 6/1998 | Boyd, Jr. | |
| 5,914,552 A | | 6/1999 | Hsu et al. | |
| 6,013,962 A | | 1/2000 | Nashiki | |
| 6,029,336 A | | 2/2000 | Kliman et al. | |
| 6,087,752 A | | 7/2000 | Kim et al. | |
| 6,262,507 B1 | | 7/2001 | Sato et al. | |
| 6,353,275 B1 | | 3/2002 | Nishiyama et al. | |
| 6,359,359 B1 | | 3/2002 | Miura et al. | |
| 6,389,678 B1 | | 5/2002 | Ackermann et al. | |
| 6,707,206 B2 | * | 3/2004 | Chang .................. | 310/156.08 |

FOREIGN PATENT DOCUMENTS

DE       10247907      9/2003
EP       0 569 594 A1  11/1993

(Continued)

Primary Examiner—Joseph Waks
(74) Attorney, Agent, or Firm—The Law Office of Randall T. Erickson, P.C.

(57) ABSTRACT

A rotor for a permanent magnet motor includes a rotor body and a plurality of permanent magnets carried by the rotor body. The rotor body has an outside rotor surface with a plurality of dovetail slots formed on the outside rotor surface. Each magnet is fit within one of the slots, protruding outward of the outside rotor surface in a radial direction. According to another embodiment, a rotor is provided having a rotor body that carries a plurality of magnets on its outside surface, and end caps that are fastened respectively to longitudinal ends of the rotor body. The end caps each have a angled rim surfaces that overhangs an end portion of the outer magnet surface of each of the magnets to retain the magnets onto the rotor body. The angled rim surfaces and the magnets can be configured such that by drawing the end caps tightly against the rotor body by use of fasteners, the magnets are wedged down onto the rotor body by the angled rim surfaces.

6 Claims, 2 Drawing Sheets

FOREIGN PATENT DOCUMENTS

| | | | |
|---|---|---|---|
| JP | 62247745 | | 10/1987 |
| JP | 09084283 A | * | 3/1997 |
| JP | 2001169485 | | 6/2001 |
| JP | 2001186698 A | * | 7/2001 |

* cited by examiner

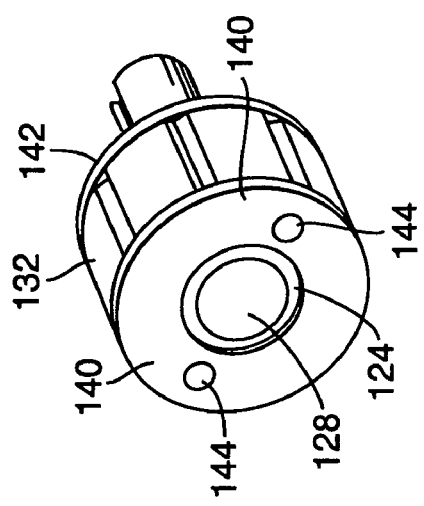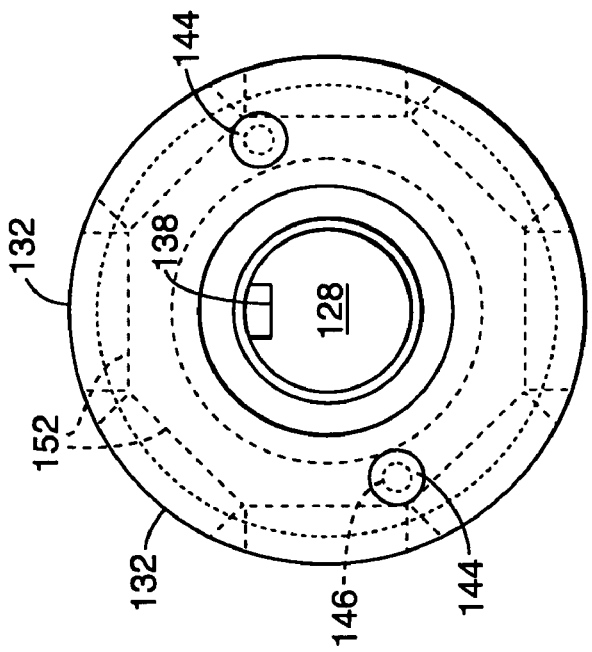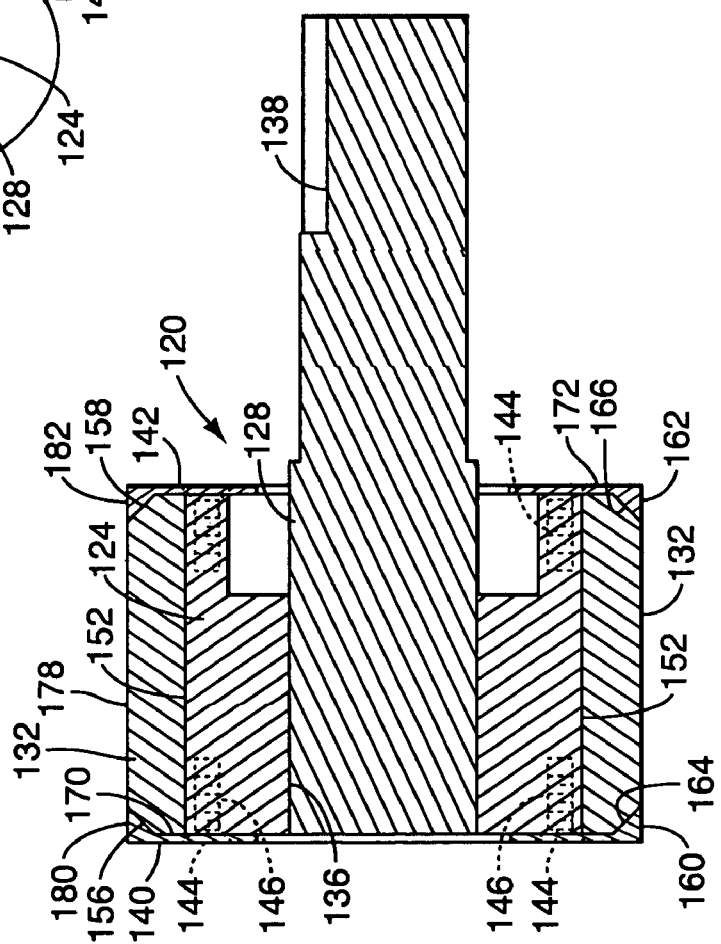

ately around the rotor thereby forming rotating magnetic fields. Due to the permanent magnets, magnetic fields are formed individually for the predetermined poles, so that the motor size can be reduced and the motor output can be increased.

PERMANENT MAGNET MOTOR

TECHNICAL FIELD OF THE INVENTION

The invention relates to permanent magnet motors wherein a rotor carries plural permanent magnets and is driven by energized stator-side coils.

BACKGROUND OF THE INVENTION

In conventional permanent magnet motors, the rotor comprises a plurality of permanent magnets are carried by a rotor body and arranged so that magnetic poles are formed. The rotor is driven by electrified stator-side coils that are disposed substantially around the rotor thereby forming rotating magnetic fields. Due to the permanent magnets, magnetic fields are formed individually for the predetermined poles, so that the motor size can be reduced and the motor output can be increased.

In the prior art, the rotor permanent magnets have been rectangularly shaped and adhesively secured to the outside of the rotor body and supported against centripetal load by a hoop fit over the rotor periphery. Other arrangements include rectangular magnets fit into closed slots within the rotor body near the rotor surface.

U.S. Pat. No. 4,242,610 describes an arrangement wherein wedge-shaped permanent magnets are carried by a rotor body. The rotor body includes wedge shaped slots which hold the magnets. The magnets are shorter in length than the slots. The outer surface of the magnets is flush with the cylindrical outside surface of the rotor body. A hoop is fit over the outside surface of the magnets to assist in retaining the magnets. This arrangement requires the rotor body and the magnets to be ground to precise dimension and a hoop to be heat shrunk around a perimeter of the rotor body.

The present inventors have recognized the desirability of providing a permanent magnet rotor construction that reduced manufacturing time and cost and which increased operating reliability of the rotor.

SUMMARY OF THE INVENTION

The invention provides an improved assembly and construction of a permanent magnet motor. The motor includes a rotor that is rotated by magnetic interaction with a stator. The rotor includes a rotor body and a plurality of permanent magnets carried by the rotor body.

According to one aspect of the invention, the rotor body has an outside rotor surface with a plurality of slots formed on the outside rotor surface. Each slot has converging side walls in an outward radial direction. Each magnet of the plurality of permanent magnets is fit within one of the slots, each magnet having an outer magnet surface protruding outward of the outside rotor surface in a radial direction.

The aggregate outer magnet surface of the permanent magnets is rounded to a finished circular diameter.

Preferably, the magnets are adhesively secured within said slots although because of the configuration of the slots, the reliance on the adhesive bond is reduced.

Preferably the facing side walls of each slot converge in a tangential direction taken in an outward radial direction.

Preferably the magnets have a longer radial length than the slots.

Preferably the slots are dovetail-shaped in cross section along a longitudinal direction of the rotor body, and the magnets have correspondingly dovetail-shaped base portions to be tightly longitudinally slid into the slots.

The outside surface of the rotor body has a discontinuous cylindrical rotor surface between adjacent slots, and the outer aggregate magnet surface protrudes outward of the discontinuous cylindrical rotor surface in a radial direction.

According to this embodiment, the rotor body need not have a precisely machined outer surface since it is the magnets, which protrude outwardly of the rotor body, that are maintained within a pre-determined gap from an inside surface of the stator. Also, no outer hoop is required to retain the magnets.

According to another aspect and embodiment of the invention, a rotor is provided having a rotor body with an outside rotor surface. A plurality of permanent magnets are provided, each of the magnets of the plurality are fit onto the outside rotor surface, each magnet having a rounded outer magnet surface. First and second end caps are fastened respectively to longitudinal ends of the rotor body; the end caps each having a rim that overhangs an end portion of the outer magnet surface of each of the magnets to retain the magnets onto the rotor body.

Preferably the magnets are adhesively secured to the outside rotor surface to additionally secure the magnets to the rotor body.

Preferably the rims each include angled rim surfaces at each magnet facing the outer magnet surface. Each angled rim surface is angled in an outward radial direction obliquely toward the respective other rim. The outer magnet surface of each magnet includes an angled surface portion at each longitudinal end of the outer magnet surface. The angled surface portion at each longitudinal end of each magnet is fit flushly against the angled rim surface of one of the rims of the first and second end caps. The angled rim surfaces and the magnets can be configured such that by drawing the end caps tightly against the rotor body by use of fasteners, the magnets are wedged down onto the rotor body by the angled rim surfaces.

Preferably the angled rim surface of each rim is annular and continuous.

Preferably the aggregate outer magnet surface of the magnets defines a discontinuous cylindrical surface having a maximum diameter and an outer surface of each of the end caps has an end cap diameter equal to the maximum diameter.

The embodiment of the invention also simplifies manufacturing of the rotor in that the outside surface of the rotor body need not be machined to a precise tolerance. The aggregate magnet outer surface defines the precise diameter to be within a tolerance distance from the inside surface of the stator.

The permanent magnet motor of the present invention is particularly useful in driving a reel mower such as described in U.S. Ser. No. 10/651,016 filed on the same day as the present invention, herein incorporated by reference.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a perspective view of an alternate embodiment permanent magnet motor rotor of the present invention;

FIG. 5 is a longitudinal sectional view of the rotor of FIG. 4; and

FIG. 6 is a right side view of the rotor of FIG. 5.

DETAILED DESCRIPTION OF THE PREFERRED EMBODIMENTS

Figure 1:
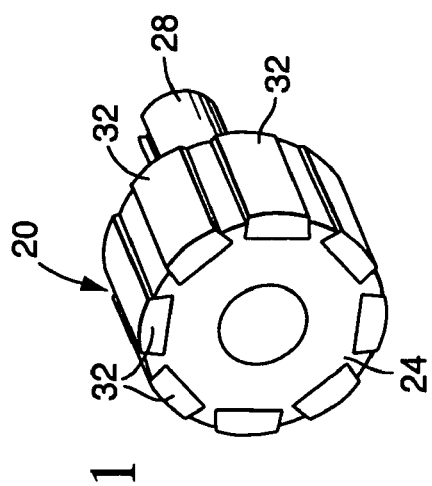
FIG. 1 is a perspective view of a permanent magnet motor rotor of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 3:
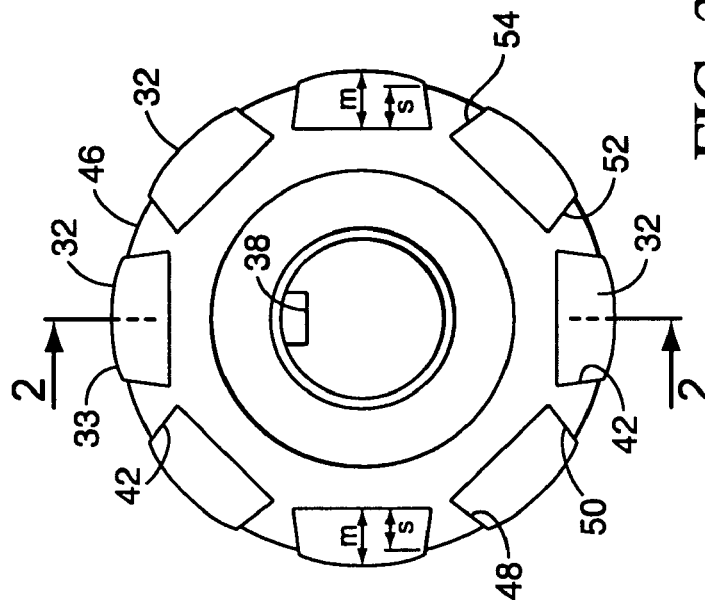
FIG. 3 is a right side view of the rotor of FIG. 2.
Figure 2:
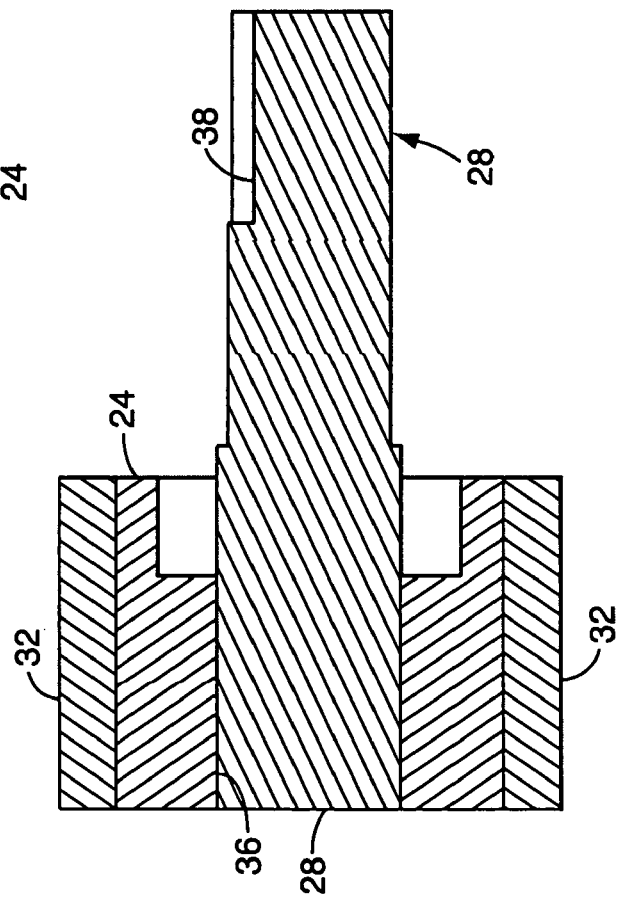
FIG. 2 is a longitudinal sectional view of the rotor of FIG. 1.

FIGS. 1–3 illustrate a rotor 20 of the present invention. The rotor is typically fit within close tolerance into a stator having coils or windings, such as described in U.S. Pat. Nos. 6,353,275 and 6,087,752, herein incorporated by reference. The rotor 20 includes a rotor body 24, a shaft 28 and a plurality of permanent magnet 32 carried by the rotor body. The rotor shaft 28 is keyed into or press fit into an aperture 36 of the rotor body 24, such that the shaft 28 and the body 24 are fixed to rotate conjointly. The shaft 28 includes a keyway 38 at an output end thereof, in order that the shaft 28 can be fixed to an output pulley, sprocket or directly to a rotary device.

The magnets 32 are fit into circumferentially spaced-apart slots 42 formed into the rotor body 24.

As indicated in FIG. 3, the magnets 32 have a radial length M greater than a radial length S of the slots 42. The magnets 32 together define an aggregate discontinuous cylindrical magnet surface 33 that protrudes radially above a discontinuous cylindrical body surface 46 of the body 24.

The slots 42 each have facing slot side walls 48, 50 that converge tangentially in an outward radial direction. The magnets have angled magnet sidewalls 52, 54 that also converge tangentially in an outward radial direction. The arrangement of the slot side walls 48, 50 and magnet sidewalls 52, 54 captures the magnets within the slots.

The magnets 32 can be dovetail-shaped and sized to fit tightly within the slots 42, having a corresponding dovetail shape. Alternatively, or additionally, a layer of adhesive can be applied between the magnet and the bottom and/or side walls of the slots 42 to secure the magnets therein.

As illustrated in FIG. 3, the surface 46 of the rotor body 24 is recessed from the aggregate magnet surface 33. Thus, the surface 46 need not be machined to maintain a close tolerance to an inside surface of the stator. Only the magnet surface 33 should be machined to form a close tolerance gap to the inside surface of the stator. This achieves a manufacturing time and cost advantage.

FIGS. 4–6 illustrate an alternate rotor 120 including a rotor body 124, a shaft 128 and a plurality of permanent magnet 132 carried by the rotor body 124. The rotor shaft 128 is keyed into or press fit into an aperture 136 of the rotor body 124, such that the shaft 128 and the body 124 are fixed to rotate conjointly. The shaft 128 includes a keyway 138 at an output end thereof, in order that the shaft 128 can be fixed to an output pulley, sprocket or directly to a rotary device.

The rotor 120 further includes end caps 140, 142 arranged on opposite longitudinal ends of the body 124. The end caps 140, 142 are fastened to the rotor body 124 by fasteners 144, two for each end cap 140, 142, threaded into threaded bores 146 of the body 124.

The magnets 132 are fit onto circumferentially spaced apart flats 152 formed onto the rotor body 124. The magnets 132 include angled sidewall portions 156, 158. The angled sidewall portions 156, 158 are inclined obliquely in an outward radial direction toward each other. The end caps 140, 142 include rims 160, 162 that have angled surfaces 164, 166 that fit flushly against the angled sidewall portions 156, 158. The angled surfaces are inclined in an outward radial direction obliquely toward each other, i.e., toward the respective other rim. The angled surfaces 164, 166 can be annular surfaces. The rims 160, 162 retain the magnets 132 in a radial direction and, along with side portions 170, 172, retain the magnets 132 in the longitudinal direction. The angled surfaces 164, 166 and the angled sidewall portions 156, 158 can be shaped such that by drawing the end caps tightly against the rotor body by use of the fasteners 144, the magnets 132 are wedged down onto the rotor body 124 by the angled surfaces 164, 166.

The magnets can additionally be adhesively secured to the flats 152. The magnets can additionally be adhesively secured to the caps 140, 142.

The magnets 132 can protrude in an outward radial direction to an aggregate, discontinuous surface 178 that is flush with outside cylindrical surfaces 180, 182 of the caps 140, 142. Alternatively, the surfaces 180, 82 can be slightly radically recessed from the surface 178 of the magnets, allowing the surface 178 to protrude.

This embodiment is advantageous in that an outside surface the rotor body need not be machined to a close tolerance with respect to the inside surface of a stator. Only the magnets need to be machined to be within a close gap tolerance to the stator inside surface. The end caps can also be machined to have an identical close gap tolerance as the magnets if desired, or can be recessed from the magnet outside surface such that only the magnets need be machined to the close gap tolerance. According to either exemplary embodiment the rotor body comprises a low carbon steel. The magnets can be rare earth magnets such as neodimnium.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a permanent magnet motor having a rotor turned by electro-magnetic interaction with a stator, the rotor comprising:
    a rotor body with an outside rotor surface;
    a plurality of permanent magnets, each of said magnets of said plurality fit onto said outside rotor surface, each magnet having an outer magnet surface; and
    first and second end caps fastened respectively to longitudinal ends of said rotor body, said end caps having rims that overhang end portions of said outer magnet surface of each of said magnets to retain said magnets onto said rotor body.

2. The rotor according to claim 1, wherein said outer magnet surface is rounded.

3. The rotor according to claim 1, wherein said magnets are adhesively secured to said outside rotor surface.

4. The rotor according to claim 1, wherein said rims each include angled rim surfaces at each magnet facing said outer magnet surface, each angled rim surface being angled in an outward radial direction obliquely toward the respective other rim, and said outer magnet surface of each magnet includes an angled surface portion at each longitudinal end of said outer magnet surface, said angled surface portions at each longitudinal end of each magnet being fit flushly against said angled rim surface of one of said rims of said first and second end caps.

5. The rotor according to claim 4, wherein said angled rim surface of each rim is annular.

6. The rotor according to claim 5, wherein said outer magnet surfaces define a discontinuous cylindrical surface having a maximum diameter and an outer surface of each of said end caps has an end cap diameter equal to said maximum diameter.

* * * * *